United States Patent Office 3,446,857
Patented May 27, 1969

3,446,857
PROCESS OF PREPARING FLUORODINITRO-
ETHANOL OR FLUORODINITROMETHANE
FROM FLUOROTRINITROMETHANE
Horst G. Adolph, Silver Spring, Md., assignor to the
United States of America as represented by the Secretary of the Navy
No Drawing. Filed July 31, 1964, Ser. No. 387,556
Int. Cl. C07d 31/34, 33/10
U.S. Cl. 260—633     8 Claims The invention described herein may be manufactured and used by or for the Government of the United States of America for governmental purposes without the payment of any royalties thereon or therefor.

This invention relates to novel methods for the preparation of fluorine-containing an nitro-containing aliphatic compounds. Specifically, the invention is directed to novel methods for the preparation of fluorodinitromethane, and fluorodinitroethanol.

In the past, fluorodinitroethanol has been prepared by the aqueous fluorination of sodium or potassium dinitroethanol, which was in turn obtained from nitromethane via mononitropropanediol and dinitropropanediol. This procedure was, however, rather tedious and, moreover, dinitropropanediol is not readily obtained.

It has now been unexpectedly found that fluorodinitroethanol may be prepared in high yield by the reduction of fluorotrinitromethane with hydrogen-peroxide in the presence of a base and formaldehyde. It has further been found that, in the absence of aldehyde, the reduction of fluorotrinitromethane will yield fluorodinitromethane.

Accordingly, the objects of this invention are:
(1) The preparation of fluorodinitroethanol from fluorotrinitromethane and
(2) The preparation of fluorodinitromethane from fluorotrinitromethane.

The objects of the invention are accomplished via general reaction scheme of the invention which may be illustrated as follows:

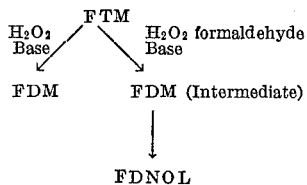

wherein:
FTM is fluorotrinitromethane,
FDM is fluorodinitromethane,
FDNOL is fluorodinitroethanol.

GENERAL PROCEDURE

As may be seen from the reaction scheme illustrated above, the alkaline reduction of FTM in the presence of formaldehyde will yield FDNOL via an unstable FDM intermediate phase. By excluding aldehydes from the reaction, however, FDM may be obtained. In the remainder of this specification, FTM, FDM and FDNOL will be used to designate fluorotrinitromethane, fluorodinitromethane and fluorodinitroethanol, respectively.

The reduction procedure of FTM is specific, that is, the reduction of other halotrinitromethanes, such as chlorotrinitromethane and bromotrinitromethane in the presence of base, does not produce the corresponding dinitro compound. Instead, it has been found that such reduction procedure, except in the case of FTM, merely results in the loss of halogen.

The invention will be more fully understood by reference to the following examples which are intended only to more fully illustrate the invention and are not to be construed as limitations thereon.

Example I

This example illustrates the preparation of FDM from FTM.

To a solution of 5 g. of FTM in 10 ml. of methanol there was added, dropwise at −10° C., a mixture of 6.7 g. of 30% hydrogen peroxide and a solution of 3.3 g. of KOH in 15 ml. of methanol. A precipitate formed and, after completion of the addition, the mixture was poured into ice-cold dilute sulfuric acid and the resulting solution extracted with methylene chloride. The extracts were dried over magnesium sulfate and the solvent was distilled off. The residue, distilled in vacuo, gave 1.5 g. (41% of theoretical) of FDM, the purity by gas chromatographic analysis being approximately 85%.

Examples II–IV

Examples II through IV, presented in tabular form in Table I, below, illustrate the preparation of FDM from FTM under varying reaction conditions.

TABLE I.—PREPARATION OF FDM FROM FTM

| Example: | Materials | Conditions | Products |
|---|---|---|---|
| 2 | 5 g. FTM in 10 ml. CH$_3$OH, 6.7 g. ca. 30% H$_2$O$_2$, 3.3 g. KOH in 15 ml. CH$_3$OH. | H$_2$O$_2$ and base mixed and added to FTM at −10° C. in 15 min. then poured into ice/dil. sulfuric acid. | 1.5 g. (41%) of ca. 85% pure FDM. |
| 3 | 5 g. FTM in 15 ml. CH$_2$Cl$_2$, 3.3 g. KOH in 15 ml. CH$_3$OH, 4 g. 30% H$_2$O$_2$. | First base, then H$_2$O$_2$ added to CH$_2$Cl$_2$ soln. at −10° C. in 15 min. then poured into ice/dil. sulfuric acid. | 2.7 g. of a mixture, containing 31% FDM. |
| 4 | 5.4 g. FTM in 15 ml. 50% aqueous CH$_3$OH, 3.7 g. KOH in 15 ml. same solvent, 4.4 g. 30% H$_2$O$_2$. | H$_2$O$_2$ added at −20° C. in 15 min. to mixture of FTM and base. Drowned immediately, without allowing mixture to warm up. | 1.4 g. (35%) FDM; purity ca. 85%. |

Example V

This example illustrates the preparation of FDNOL from FTM.

An amount of 175 ml. of 30% aqueous hydrogen peroxide (1.5 mole and 140 ml. of 37% aqueous formaldehyde solution (1.7 mole) were placed in a two-liter flask and cooled in an ice bath to 5° C. About 1 ml. of a solution of 29 g. sodium hydroxide (0.72 mole) in 180 ml. water was added to the mixture with stirring, causing the temperature to rise to about 15° C. With continued cooling, 280 ml. methanol were added and the temperature was brought to 5° C. An amount of 100 g. FTM was then placed in the flask, an ice-salt bath being used to effect cooling. The remaining 179 ml. sodium hydroxide were then added over a period of 20–25 minutes and dilute sulphuric acid was added after completion of the addition of the base. Upon addition of the acid, the temperature rose to about 20° C. The solution was then saturated with sodium chloride and extracted with methylene chloride.

The extract was dried and distilled to obtain 69 g. (75% theoretical) of FDNOL; B.P. 53–56° C. Purity, by gas chromatography, was 88%.

Examples VI–XI

Examples VI through XI, set forth in tabular form in Table II, below, further illustrate the preparation of FDNOL from FTM under varying reaction parameters and reactant concentrations.

TABLE II.—PREPARATION OF FDNOL FROM FTM

| | | Materials per 10 g. FTM | | | | |
|---|---|---|---|---|---|---|
| Example: | Scale, g. FTM | $H_2O_2$ (ml.) | $CH_2O$ (ml.) | MeOH (ml.) | NaOH (g. in ml. $H_2O$) | Conditions | Yield of FDNOL, percent |
| 6 | 5 | 20 | 7 | 20 | 6.6 KOH, 40 | Base added below −10° to mixture of others | Ca. 40. |
| 7 | 5 | 30 | 30 | 50 | 4.7, 30 | Base added at 5–10° in 40 min | Ca. 65. |
| 8 | 15 | 30 | 30 | 40 | 4.7, 30 | Base added below 0° in 30 min | 73; purity 81 mole percent. |
| 9 | 15 | 20 | 20 | 40 | 3.3, 20 | Base added at ca. 0° in 30 min | 81; purity 82 mole percent. |
| 10 | 42.7 | 20 | 20 | 40 | 3.2, 20 | Base added at 0–5° in 30 min | 80; purity 85 mole percent. |
| 11 | 140 | 18 | 18 | 32 | 3.1, 18.5 | Base added at ca. 5° in 20–25 min | 81.5; purity 85 mole percent. |

As stated previously, the alkaline reduction of the fluorotrinitromethyl group to the fluorodinitromethyl group was unexpectedly found to be specific to the compounds instantly illustrated (i.e. FTM and FDM) and, for best results, the solution should be at about pH 8 and at a temperature of from 0°–5° C. Broadly, the temperature may range from as low as −20° C. to about 15° C.

Although water may be used as the reaction diluent, satisfactory results may be obtained by using water miscible diluents such as acetone and alcohol.

The reducing agent which is used in combination with alkali metal hydroxides, such as sodium hydroxide and potassium hydroxide, is hydrogen peroxide although other reducing agents such as potassium iodide and sodium arsenite may also be used in the practice of the invention.

Aldehydes which may be used in the instant invention are any of the commonly known aliphatic aldehydes and dialdehydes such as formaldehyde, acetaldehyde, etc.

Obviously, many modifications and variations of the present invention are possible in the light of the above teachings. It is therefore to be understood that, within the scope of the appended claims, the invention may be practiced otherwise than as specifically described.

Having thus described the invention, what is claimed and desired to be secured by Letters Patent of the United States is:

1. The method of preparing fluorodinitromethane which comprises reacting fluorotrinitromethane with a reducing agent selected from the group consisting of hydrogen peroxide, potassium iodide, and sodium arsenite in an alkaline medium.

2. The method for preparing fluorodinitroethanol which comprises reacting fluorotrinitromethane with a reducing agent selected from the group consisting of hydrogen peroxide, potassium iodide, and sodium arsenite in the presence of a base and formaldehyde.

3. The process of preparing fluorodinitromethane which comprises, reacting a solution of fluorotrinitromethane in methanol with a reducing agent selected from the group consisting of hydrogen peroxide, potassium iodide and sodium arsenite in the presence of an alkaline medium.

4. The process of claim 3 wherein said alkaline medium is selected from the group consisting of sodium hydroxide and potassium hydroxide.

5. The process of claim 4 wherein the temperature during said reaction is maintained between about −20° C. and 15° C.

6. The process of preparing fluorodinitroethanol which comprises reacting fluorotrinitromethane with a reducing agent selected from the group consisting of hydrogen peroxide, potassium iodide and sodium arsenite in the presence of a base, formaldehyde and methanol.

7. The process of claim 6 wherein said base is selected from the group consisting of sodium hydroxide and potassium hydroxide.

8. The process of claim 7 wherein the temperature during said reaction is maintained between about −20° C. and 15° C.

References Cited

UNITED STATES PATENTS 3,127,736  4/1964  Bost et al. _____ 60—35.4

LELAND A. SEBASTIAN, Primary Examiner.

U.S. Cl. X.R.

260—644